(12) United States Patent  
Thomas

(10) Patent No.: US 9,053,320 B2  
(45) Date of Patent: Jun. 9, 2015

(54) METHOD OF AND APPARATUS FOR IDENTIFYING REQUESTORS OF MACHINE-GENERATED REQUESTS TO RESOLVE A TEXTUAL IDENTIFIER

(75) Inventor: Matthew Thomas, Lausanne (CH)

(73) Assignee: VERISIGN, INC, Reston, VA (US)

(*) Notice: Subject to any disclaimer, the term of this patent is extended or adjusted under 35 U.S.C. 154(b) by 124 days.

(21) Appl. No.: 12/859,810

(22) Filed: Aug. 20, 2010

(65) Prior Publication Data

US 2012/0047173 A1    Feb. 23, 2012

(51) Int. Cl.
*G06F 21/55* (2013.01)
*G06F 17/30* (2006.01)

(52) U.S. Cl.
CPC ........ *G06F 21/552* (2013.01); *G06F 17/30598* (2013.01)

(58) Field of Classification Search
CPC .................... G06F 17/30386; G06F 17/30598
USPC .......................... 707/737, 702, 703, 999.009
See application file for complete search history.

(56) References Cited

U.S. PATENT DOCUMENTS

| | | | | |
|---|---|---|---|---|
| 7,818,795 | B1* | 10/2010 | Arad | 726/13 |
| 7,890,602 | B1* | 2/2011 | Parsons et al. | 709/218 |
| 8,260,914 | B1* | 9/2012 | Ranjan | 709/224 |
| 2003/0145232 | A1* | 7/2003 | Poletto et al. | 713/201 |
| 2006/0236401 | A1* | 10/2006 | Fosdick | 726/25 |
| 2007/0209068 | A1* | 9/2007 | Ansari et al. | 726/13 |
| 2008/0005127 | A1 | 1/2008 | Schneider | |
| 2008/0016233 | A1 | 1/2008 | Schneider | |
| 2009/0013089 | A1 | 1/2009 | Sullivan et al. | |
| 2010/0100957 | A1 | 4/2010 | Graham et al. | |
| 2010/0122342 | A1* | 5/2010 | El-Moussa et al. | 726/22 |

OTHER PUBLICATIONS

Steven Cheung, Denial of Service against the Domain Name System:Threats and Countermeasures, Jul. 27, 2005, SRI International, CSL Technical Report SRI-CSL-05-02, (http://www.csl.sri.com/users/cheung/SRI-CSL-05-02.pdf).*

* cited by examiner

*Primary Examiner* — Alexey Shmatov  
(74) *Attorney, Agent, or Firm* — MH2 Technology Law Group, LLP

(57) ABSTRACT

Methods and systems provide tracking or logging requests to resolve non-existent textual identifiers and classifying the textual identifier into a predefined set of taxonomical categories to support the detection of requestors of machine generated requests to resolve textual identifiers. Detection includes calculating a measure of probability based on the analysis and classification of prior textual identifier requests from a requestor.

23 Claims, 9 Drawing Sheets

10-20-2009:22.01.21:tko2:113.142.10.14:pozyq.com.:A
10-20-2009:22.05.33:tko2:216.240.130.59:kalpakianmd.com.:A
10-20-2009:22.13.12:tko2:216.240.130.59:kalpana-asok.com.:A
10-20-2009:22.42.03:tko2:83.49.126.188:ifecltko.net.:A
10-20-2009:22.55.25:tko2:113.142.10.13:fpuvet.com.:A
10-20-2009:22.56.13:tko2:202.96.136.231:younyshiny.com.:A
10-20-2009:22.57.04:tko2:113.142.10.14:qdping.com.:A
10-20-2009:22.58.07:tko2:66.133.150.37:jrrination.com.:A
10-20-2009:22.13.02:tko2:60.254.209.155:kaicn.com.:A
10-20-2009:22.25.05:tko2:116.113.84.26:wzqejb.com.:A
10-20-2009:22.26.43:tko2:60.215.138.62:china-longyang.com.:A
10-20-2009:22.26.23:tko2:113.142.10.13:gdopus.com.:A
10-20-2009:22.34.16:tko2:113.142.10.14:qdqtl.com.:A
10-20-2009:22.43.13:tko2:113.142.10.14:qdprt.com.:A

METHOD OF AND APPARATUS FOR IDENTIFYING REQUESTORS OF MACHINE-GENERATED REQUESTS TO RESOLVE A TEXTUAL IDENTIFIER

CROSS-REFERENCE TO RELATED APPLICATIONS

This application is related to U.S. application Ser. No. 12/763,349, filed Apr. 20, 2010, and U.S. application Ser. No. 12/859,820, filed Aug. 20, 2010, the disclosure of each of which is incorporated in its entirety.

TECHNICAL FIELD

The following disclosure relates generally to identifying sources of machine generated traffic to resolve textual identifiers, and more particularly to identifying requestors of machine generated requests of textual identifiers such as non-registered and non-existent domain names.

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("Web page") is sent from a client computer system to a Web server computer system ("Web server") from which that Web page can be obtained, the client computer system typically includes the IP address of the Web server.

In order to make the identification of destination computer systems more mnemonic, a Domain Name System (DNS) has been developed that translates a unique alphanumeric name for a destination computer system into the IP address for that computer. The alphanumeric name is called a "domain name." For example, referring to FIG. 9, the domain name for a hypothetical computer system operated by IBM Corporation may be "comp23.IBM.com". Using domain names, a user attempting to communicate with this computer system could specify a destination of "comp23.IBM.com" rather than the particular IP address of the computer system (e.g., 198.81.209.25).

A user can also request a particular resource (e.g., a Web page or a file) that is available from a server computer by specifying a unique Universal Resource Indicator ("URI"), such as a Uniform Resource Locator ("URL"), for that resource. A URL includes a protocol to be used in accessing the resource (e.g., "http:" for the HyperText Transfer Protocol ("HTTP")), the domain name or IP address of the server that provides the resource (e.g., "comp23.IBM.com"), and optionally a path to the resource (e.g., "/help/HelpPage-.html"). Thus "http://comp23.IBM.com/help/HelpPage-.html" is one example of a URL. In response to a user specifying such a URL, the comp23.IBM.com server would typically return a copy of the "HelpPage.html" file to the user.

In addition to making the identification of destination computer systems more mnemonic, domain names introduce a useful layer of indirection between the name used to identify a destination computer system and the IP address of that computer system. Using this layer of indirection, the operator of a particular computer system can initially associate a particular domain name with a first computer system by specifying that the domain name corresponds to the IP address of the first computer system. At a later time (e.g., if the first computer system breaks or must be replaced), its operator can "transfer" the domain name to a second computer system by then specifying that the domain name corresponds to the IP address of the second computer system.

The domain names in DNS are structured in a hierarchical, distributed database that facilitates grouping related domain names and computers and ensuring the uniqueness of different domain names. In particular, as mentioned above, a particular domain name such as "IBM.com" may identify a specific host computer. However, the hierarchical nature of DNS also allows a domain name such as "IBM.com" to represent a domain including multiple other domain names each identifying computers (also referred to as "hosts"), either in addition to or instead of identifying a specific computer.

FIG. 9 illustrates a hypothetical portion of the DNS database 900 in which the node representing the IBM.com domain name 910 is the root node in an IBM.com domain 950 that includes 7 other nodes each representing other domain names. Each of these domain names in the IBM.com domain can be, but do not have to be, under the control of a single entity (e.g., IBM Corporation). FIG. 9 also includes a WebHostingCompany.com domain 955 that includes a single domain name.

As illustrated, the DNS database can be represented with a hierarchical tree structure, and the full domain name for a given node in the tree can be determined by concatenating the name of each node along the path from the given node to the root node 901, with the names separated by periods. Thus, the 8 nodes in the IBM.com domain represent the domain names IBM.com 910, foo.IBM.com 912, foo.foo.IBM.com 918, bar.foo.IBM.com 920, bar.IBM.com 914, comp23.IBM.com 916, abc.comp23.IBM.com 922, and cde.comp23.IBM.com 924. Other ".com" domain names outside the IBM.com domain are also illustrated in FIG. 9, including the second-level domain names BCD-Corp.com 932, WebHostingCompany.com 934, 1-800-555-1212.com 942 and 123456.com 944, and the lower-level domain names 123.123456.com 946 and 456.123456.com 948. In addition to the ".com" top-level domain ("TLD"), other TLDs are also illustrated including the ".cc" geographical TLD and the ".gov", ".edu" and ".mil" organizational TLDs. Illustrated domain names under these other TLDs include Stanford.edu 936, Berkeley.edu 938, and RegistrarCompany.cc 940.

New domain names can be defined (or "registered") by various domain name registrars. In particular, a company that serves as a registrar for a TLD can assist customers in registering new domain names for that TLD and can perform the necessary actions so that the technical DNS information for those domain names is stored in a manner accessible to name servers for that TLD. Registrars often maintain a second-level domain name within the TLD (e.g., a hypothetical Registrar Company that acts as a registrar for the ".cc" TLD could maintain the RegistrarCompany.cc domain name 940), and provide an interactive Website at their domain name from which customers can register new domain names. A registrar will typically charge a customer a fee for registering a new domain name.

For the ".com", ".net" and ".org" TLDs, a large number of registrars currently exist, and a single shared registry ("the Registry") under the control of a third-party administrator stores information identifying the authoritative name servers for the second-level domain names in those TLDs. Other TLDs may have only a single registrar, and if so that registrar could maintain a registry for all the second-level domains in that TLD by merely storing the appropriate DNS information for each domain name that the registrar registers. In other situations, multiple registrars may exist for a TLD, but one of the registrars may serve as a primary registrar that maintains a registry for each of the second-level domains in that TLD. If so, the secondary or affiliate registrars for that TLD supplies the appropriate DNS information for the domain names that they register to the primary registrar. Thus, the manner in which the DNS information for a TLD is obtained and stored is affected by the registrars for that TLD.

Users of the aforementioned DNS generally do not communicate directly with a Root DNS Server. Instead, as illustrated in FIG. 10, DNS resolution takes place transparently in applications programs such as web browser and other Internet applications at the PC level. When an application makes a request that requires a domain name lookup, such programs send a resolution request to the DNS resolver in the local operating system, which in turn handles the communications required.

The DNS resolver often has a cache containing recent lookups. If the cache can provide the answer to the request, the resolver will return the value in the cache to the program making the request. If the cache does not contain the answer (or the information has expired), the resolver will typically send the request through a series of network devices to one or more designated DNS servers. In the case of most home users, the Internet Service Provider (ISP) to which the machine connects will supply this DNS server. In any event, the name server thus queried will follow the process outlined above until it successfully finds a result or determines that none is available. It then returns any results to the DNS resolver, the resolver caches the result for future use and passes the result back to the software which initiated the request.

In the case of a domain that is not registered, a corresponding domain resolution request will need to traverse to the level of an Authoritative Root DNS Server. The Root DNS Server will reply with an authoritative response of a "non-existent domain". Requests to resolve such non-existent domains are retained in an external repository. FIG. 8 illustrates an exemplary set of logs to resolve such domains. NXDomains (or NXD) is a term used for the Internet domain name that is unable to be resolved using the DNS implementation owing either to the domain name not yet being registered or a server problem. The reference to the NXDOMAIN is published in RFC 1035 (Domain names—implementation and specification) and also in RFC 2308, both of which are incorporated herein by reference in their entireties.

FIG. 10 is a network diagram illustrating interconnected network devices and Domain Name System information. Root DNS Servers 1001 and 1002 and NXDomain Log Servers 1004 and 1005 interface with server 1003 to service requests from Upstream Provider DNS Server 1006. DNS Server 1006 is accessed by ISP DNS Server 1007 to service requests initiated by, for example, PC 1009 running a suitable client or a malicious Internet Bot connecting through Router 1008.

Because domain name resolution provided by DNS is essential to operation of the Internet and email, continual availability, operation and functioning of the system is critical. Unfortunately, not all network traffics are legitimate and as a matter of fact, a lot of malicious traffic is passed through the Internet all the time. Such malicious DNS traffic can lead to various crimes and possibly exhaust a considerable amount of network bandwidth and resources. Therefore consideration must be given to possible scenarios that might impair DNS. Threats to the operation of the network may come in several forms including Internet bots as disclosed in U.S. Patent Publication No. US 2008/0025328 of Alberts ("Alberts"), the disclosure of which is incorporated herein by reference in its entirety. Alberts discloses enabling an end-user using an IP based network to on-line select and communicate with another end-user without revealing their identity. The selection of an end-user is performed by an Internet bot that is capable of accessing a profile list such that, during a phase in which information is transferred between both end-user, the identity of at least one end-user is not known to the other end-user because information is first transferred to the Internet bot and then from the Internet bot to the other end-user. Another scenario is described in U.S. Patent Publication No. US 2008/0155694 of Kwon et al. ("Kwon"), the disclosure of which is also incorporated herein by reference in its entirety. Kwon discloses a method for dealing with attacks of malicious BOTs, software for performing or controlling a predetermined operation by a specific event or a specific command as a script code having various functions including a remote function for specific objects. When a malicious BOT attacks a specific network or system, it generates more data than the capacity of the target network or system so as to disable the normal service. Kwon discloses addressing malicious BOTs by detecting and analyzing a domain name receiving excessive DNS queries to judge the infection of a malicious BOT, registering the corresponding domain name as normal or abnormal management target, and redirecting an abnormal DNS query for the abnormal management target to a redirection processing and response system.

SUMMARY

Embodiments of the present invention utilize a technique to allow network administrators to quickly and effectively identify sources of machine generated DNS traffic to help prevent crime and reduce network congestion. These embodiments include methods, software and apparatus for tracking or logging requests to resolve unregistered, unresolvable, and/or non-existent domain (NXDomains) and classifying the NXDomains to support a mapping of the domain requestors to a taxonomical set of frequency counts.

Aspects of the present invention includes scoring the requestors using a set of heuristics and statistical approaches so as to support identification of requestors of domain names that exhibit Internet bot like characteristics such as web crawlers, bots, spiders, and robots. These Internet bots, also known as web robots, WWW robots or simply "bots", are software applications that run automated tasks over the Internet. Typically, bots perform tasks that are both simple and structurally repetitive, at a much higher rate than would be possible for a human alone. One of the largest uses of bots is in web spidering, in which an automated script fetches, analyzes and files information from web servers at many times the speed that might be manually implemented by a human.

According to one aspect of the invention, a method of identifying requestors that are the source of machine-generated requests to resolve a textual identifier includes maintaining a log of requests made by requestors to resolve unresolvable textual identifiers; identifying from among the unresolvable textual identifiers a unique set of unresolvable textual identifiers for a given time period; classifying the unresolvable textual identifiers within the unique set of unresolvable textual identifiers into predefined taxonomical sets; maintaining a mapping of (i) corresponding requestors to (ii) frequency counts of unresolvable textual identifiers within each of the taxonomical sets; and applying a set of heuristics to identify requestors exhibiting a threshold level of machine generated traffic based on statistical counts of the taxonomical sets.

According to a feature of the invention, the requestors are name servers and the textual identifiers are domain names.

According to another feature of the invention, the machine generated requests are generated by an Internet bot.

According to another feature of the invention, the internet bot is selected from the group consisting of a internet agent, search engine spider, a spider-bot, a robot, virus malware, a crawler, an ant and an automatic indexer.

According to another feature of the invention, the unresolvable textual identifiers are unregistered domain names (NX-Domains).

According to another feature of the invention, the log of requests includes an NXDomain data store.

According to another feature of the invention, identifying from among the unresolvable textual identifiers a unique set of unresolvable textual identifiers for a given time period includes storing a unique list of domains with their corresponding frequency of requests over the time period.

According to another feature of the invention, the taxonomical sets include a set of unresolvable textual identifiers exhibiting a characteristic of existing registered textual identifiers.

According to another feature of the invention, the characteristic of existing registered textual identifiers is selected from the set of characteristics consisting of a word; a prefix string (e.g., "www" and "ftp"); a character string length less than a threshold number of characters; a variation of a registered textual identifier representing a typographical or spelling error; a soundex equivalent of a registered textual identifier; a keyboard-equivalent entry of a registered textual identifier; and an edit distance from a registered textual identifier that is less than a threshold value.

According to another feature of the invention, the taxonomical sets include a set of unresolvable textual identifiers exhibiting a characteristic of existing registered domain names.

According to another feature of the invention, the characteristic of existing registered domain names is selected from the set of characteristics consisting of: a word; a subdomain prefix string (e.g., "www" and "ftp"); a character string length less than a threshold number of characters; a variation of a registered domain name representing a typographical or spelling error; a soundex equivalent of a registered domain name; a keyboard-equivalent entry of a registered domain name; and an edit distance from a registered domain name that is less than a threshold value.

According to another feature of the invention, the taxonomical sets include a set of unresolvable textual identifiers exhibiting a characteristic of unregistered textual identifiers.

According to another feature of the invention, the taxonomical sets include a set of unresolvable textual identifiers exhibiting a characteristic of unregistered domain names (NXDomains).

According to another feature of the invention, maintaining a mapping includes mapping of (i) name server IP addresses to (ii) frequency counts of classified NXDomains within each of the taxonomical sets.

According to another feature of the invention, the taxonomical sets are partitioned into (i) Internet bot generated textual identifiers and (ii) non-Internet bot generated textual identifiers.

According to another feature of the invention, applying heuristics includes identifying a threshold amount of Internet bot generated textual identifiers relative to non-Internet bot generated textual identifiers.

According to another aspect of the invention, a method of identifying textual identifiers that are candidates for registration includes identifying requestors of sources of machine generated requests to resolve textual identifiers as described above and further identifying log records of requests made by the sources of machine generated requests as suspicious requests; and creating a set of candidate textual identifiers by ignoring the suspicious requests.

According to another feature of the invention, further included are identification of the most requested non-registered textual identifiers from the set of candidate textual identifiers and a suggesting registration of the most requested non-registered identifiers.

According to another feature of the invention, further included is weighting the non-registered textual identifiers within the set of candidate textual identifiers based on numbers of requests and assigning corresponding registration fees.

According to another aspect of the invention, a method of remediating malicious network activities includes identifying requestors that are the source of machine-generated requests to resolve a textual identifier as described above; and configuring network resources to mitigate disruptive effects caused by the identified sources.

According to another feature of the invention, configuring includes throttling message traffic from the identified sources.

According to another aspect of the invention, an apparatus for identifying requestors that are the source of machine-generated requests to resolve a textual identifier includes a memory storing a log of requests made by requestors to resolve unresolvable textual identifiers; and a processor configured to identify from among the unresolvable textual identifiers a unique set of unresolvable textual identifiers for a given time period; classify the unresolvable textual identifiers within the unique set of unresolvable textual identifiers into predefined taxonomical sets; maintain a mapping of (i) corresponding requestors to (ii) frequency counts of unresolvable textual identifiers within each of the taxonomical sets; and apply a set of heuristics to identify requestors exhibiting a threshold level of machine generated traffic based on statistical counts of the taxonomical sets.

According to another aspect of the invention, an apparatus for identifying textual identifiers that are candidates for registration includes an the apparatus for identifying requestors that are the source of machine-generated requests to resolve a textual identifier as described above, with the processor further configured to identify log records of requests made by the sources of machine generated requests as suspicious requests; and create a set of candidate textual identifiers by ignoring the suspicious requests.

According to another aspect of the invention, an apparatus for remediating malicious network activities includes an apparatus for identifying requestors that are the source of machine-generated requests to resolve textual identifiers as described above, wherein the processor is further configured to configure network resources to mitigate disruptive effects caused by the identified sources.

According to another aspect of the invention, a computer-readable medium that provides instructions that, when executed by a processor, will cause the processor to perform operations including maintaining a log of requests made by requestors to resolve unresolvable textual identifiers; identifying from among the unresolvable textual identifiers a unique set of unresolvable textual identifiers for a given time period; classifying the unresolvable textual identifiers within the unique set of unresolvable textual identifiers into predefined taxonomical sets; maintaining a mapping of (i) corresponding requestors to (ii) frequency counts of unresolvable textual identifiers within each of the taxonomical sets; and applying a set of heuristics to identify requestors exhibiting a threshold level of machine generated traffic based on statistical counts of the taxonomical sets.

According to another aspect of the invention, a computer-readable medium that provides instructions that, when executed by a processor, will cause the processor to perform operations including identifying requestors of sources of machine generated requests to resolve textual identifiers as described above; identifying log records of requests made by the sources of machine generated requests as suspicious requests; and creating a set of candidate textual identifiers by ignoring the suspicious requests.

According to another aspect of the invention, a computer-readable medium that provides instructions that, when executed by a processor, will cause the processor to perform operations including identifying requestors that are the source of machine-generated requests to resolve a textual identifiers according as described above and configuring network resources to mitigate disruptive effects caused by the identified sources.

According to another aspect of the invention, a method, apparatus, and computer readable medium may be implemented to maintain a log of requests to resolve unresolvable domains, where each request made by a requestor, identify from among the requests a unique set of unresolvable domains requested within a given time period, classify the domains within the unique set of unresolvable domains into predefined taxonomical sets, maintain a count of the number of requests for each unresolvable domain made by each requestor within each of the taxonomical sets, and apply a set of heuristics to identify requestors exhibiting a threshold level of machine generated traffic based on statistical counts of the taxonomical sets. In some configurations, each of the aspects and features described herein with respect to textual identifiers also may be implemented specifically for domains and, more specifically, for unresolvable domains, unregistered domains, and/or NXDomains.

DETAILED DESCRIPTION

Figure 1:
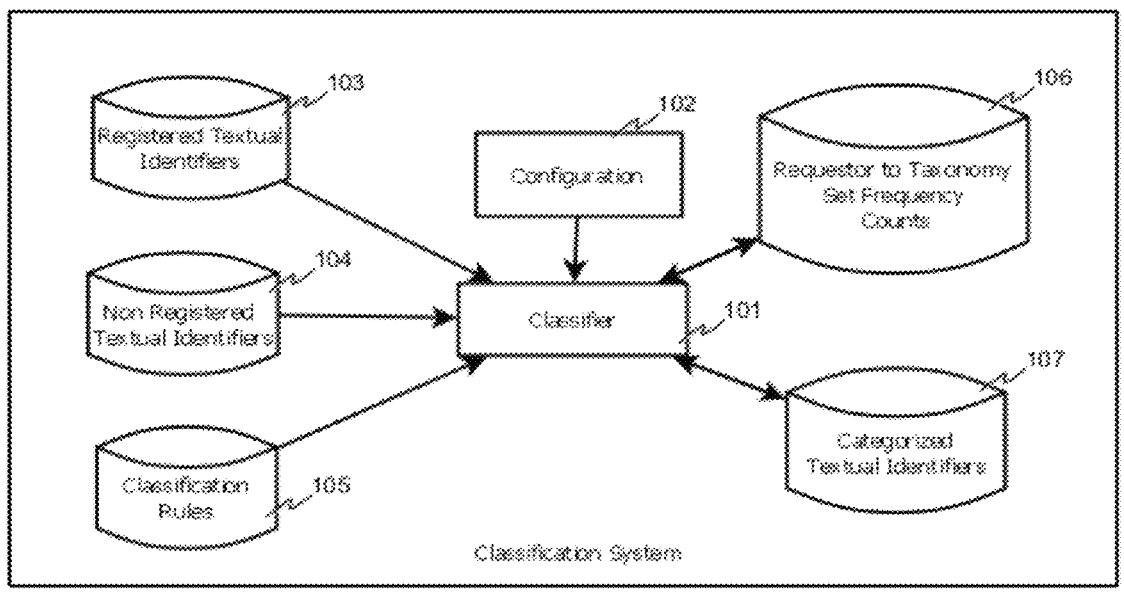
FIG. 1 is a high level component diagram of a Textual Identifier Classification System.

The following detailed description of the invention refers to the accompanying drawings. While the description includes exemplary embodiments, other embodiments are possible and changes may be made to the embodiments described without departing from the spirit and scope of the invention. The following detailed description does not limit the invention. Instead, the appended claims and their equivalents define the scope of the invention.

Described herein are some embodiments of apparatus, methods, and software systems for identifying requestors of machine generated requests to resolve textual identifiers. In particular, embodiments of the invention are applicable to classifying logged data in accordance with some set of classification rules defined a priori and support heuristic and statistical measurements of the requestors of classified textual identifiers and to identify requestors of machine generated requests to resolve textual identifiers. Thus, for illustrative purposes, some embodiments of a software facility are described below in which domain names are retrieved and classified within the NXDomain dataset. More details of embodiments of methods, apparatus and software for identifying requestors of machine generated requests to resolve textual identifiers are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein. It will be understood that the invention may be implemented using specialized instructions and/or hardware incorporated into a general purpose computer, which may convert the general purpose computer into a specific device configured according to the invention.

While various method and techniques have been described and used to detect and mitigate attacks on the DNS system, there is a continuing need to identify malicious traffic toward mitigating and otherwise processing this traffic to minimize and/or avoid undesirable effects.

Embodiments of the invention include a system, computer implemented method and software facility that provide a means of identifying requestors of machine generated requests to resolve textual identifiers. In particular, embodiments of the invention are applicable to classify logged data in accordance with some set of classification rules defined a priori and support heuristic and statistical measurements of the requestors of classified textual identifiers to identify requestors of machine generated requests to resolve textual identifiers. Thus, for illustrative purposes, some embodiments of a software facility are described below in which domain names are retrieved and classified within the NXDomain dataset. However, those skilled in the art will appreciate that the techniques of the invention can be used in a wide variety of other situations, including any situation in which a requestor of textual identifiers may exhibit machine generated characteristics and can be identified through the use of the aforementioned classification of textual identifiers and scoring. For example, embodiments of the invention may be used to combat "war dialers" as described in U.S. Pat. No. 7,035,387 of Russell et al., the disclosure of which is incorporated herein by reference in its entirety.

As used herein an "unregistered" textual identifier is one that has not been recorded in a centralized or authoritative identifier store. For example, a domain name that has not yet been registered, or for which the registration has lapsed in a DNS database, may be referred to as an "unregistered" domain name. Similarly, a textual identifier that has been so registered is referred to herein as a "registered" textual identifier. An "unregistered" identifier may be one that has never been registered, or it may be one for which the registration has lapsed or expired. For example, an "unregistered" domain name may be one that has never been registered in the DNS, or it may be one that was previously registered but for which the registration was allowed to lapse. As used herein, an "unresolvable" textual identifier is one that may or may not have been recorded in an identifier store, but for which a lookup on the central store fails. For example, each "unregistered" identifier is also "unresolvable," because a request to resolve such an identifier will fail. As another example, a registered identifier may be "unresolvable" due to a misconfiguration of the requestor, or a network problem between the requestor and the central identifier store. A request for an unregistered or otherwise unresolvable textual identifier may be answered by an indication that the identifier is unresolvable and/or unregistered. For example, a "non-existent-domain" or "NXDomain" (NXD) response may be returned by a DNS server in response to a request for a domain name that has not been registered in the DNS.

FIG. 1 is a high level overview of an exemplary textual identifier classification system. System 101 may include a configuration component 102 which may have, but is not limited to, a set of properties to define internal classification heuristics to be applied to a requestor of textual identifiers during the classification process. In the example of classifying textual identifiers such as domain names, these configuration settings may include settings such as upper and lower limits for domain lengths, edit distance limitations, etc. Classification system 101 may utilize an external repository 103 including a set of existing registered textual identifiers, such as registered domain names. The classification system 101 also retrieves a set of classification rules from an external repository of classification rules 105. As an input to the classification system 101, a repository of requests to resolve non-resolvable textual identifiers 104 may include historical requests to resolve a plurality of non-resolvable textual identifiers to a plurality of requestors.

After the initial configuration of the classification system 101 by configuration 102, the classification rule repository 105 and registered textual identifier repository 103 are loaded into memory. Thereafter, records from the unresolvable textual identifier repository 104 are sequentially retrieved and processed within the classification system 101. Resulting output records are updated or inserted in two external repositories, namely, a requestor-to-taxonomy-set count repository 106 and a categorized textual identifier repository 107. For example, the repository 106 may store records indicating the number of times various requestors request identifiers within various taxonomy sets, and/or the frequency with which requestors request identifiers within the taxonomy sets.

Figure 2:
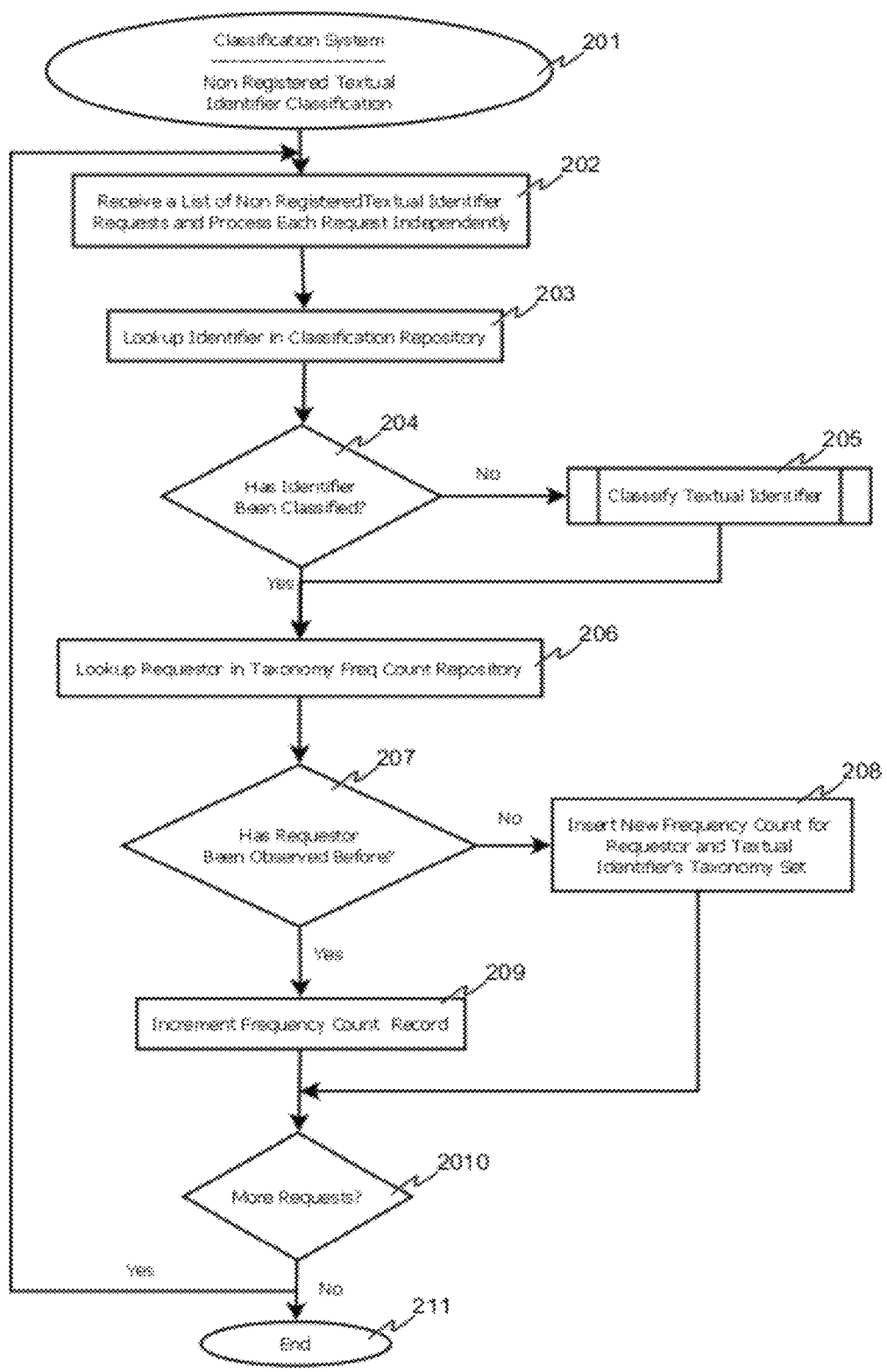
FIG. 2 is a process flow diagram of a Textual Identifier Classification System.

FIG. 2 illustrates a process flow diagram of the classification process that may be implemented by the classification system 101. The process begins at 201 in which configuration 102 is loaded and the corresponding repositories for classification rules 105 and registered textual identifiers 103 are retrieved and loaded into the classification system. Then, at 202, the system retrieves a list of unresolvable textual identifiers and processes them sequentially through the remaining process flow. The unresolvable textual identifier request retrieved at 202 is checked in an external repository of existing classified textual identifiers 107 at step 203. An inspection of the resulting lookup of step 203 is performed at 204 to determine if the textual identifier has been previously classified. If the textual identifier has previously been classified the process continues to 206. Otherwise, the process flow continues at 205 to execute a subroutine to classify the textual identifier.

After the textual identifier has either been classified at 205 or has been determined to have been previously classified at 204, the system attempts to retrieve a record in an external repository of requestor-to-taxonomy-set counts 106. At 206 an inspection of the resulting lookup is performed to determine if the requestor has been previously observed. If the requestor under consideration at step 207 is identified as having been previously observed, the frequency count for the classified record and its corresponding taxonomical sets is incremented in repository 106. If the requestor has not been observed previously, a new frequency count record for the requestor and the classified textual identifier is inserted into repository 106. The process flow continues at 210 in which an inspection is performed to determine if any other records retrieved at step 202 remain. If additional records exist, the process continues 202. Otherwise, the process completes and ends at 211.

Figure 3:
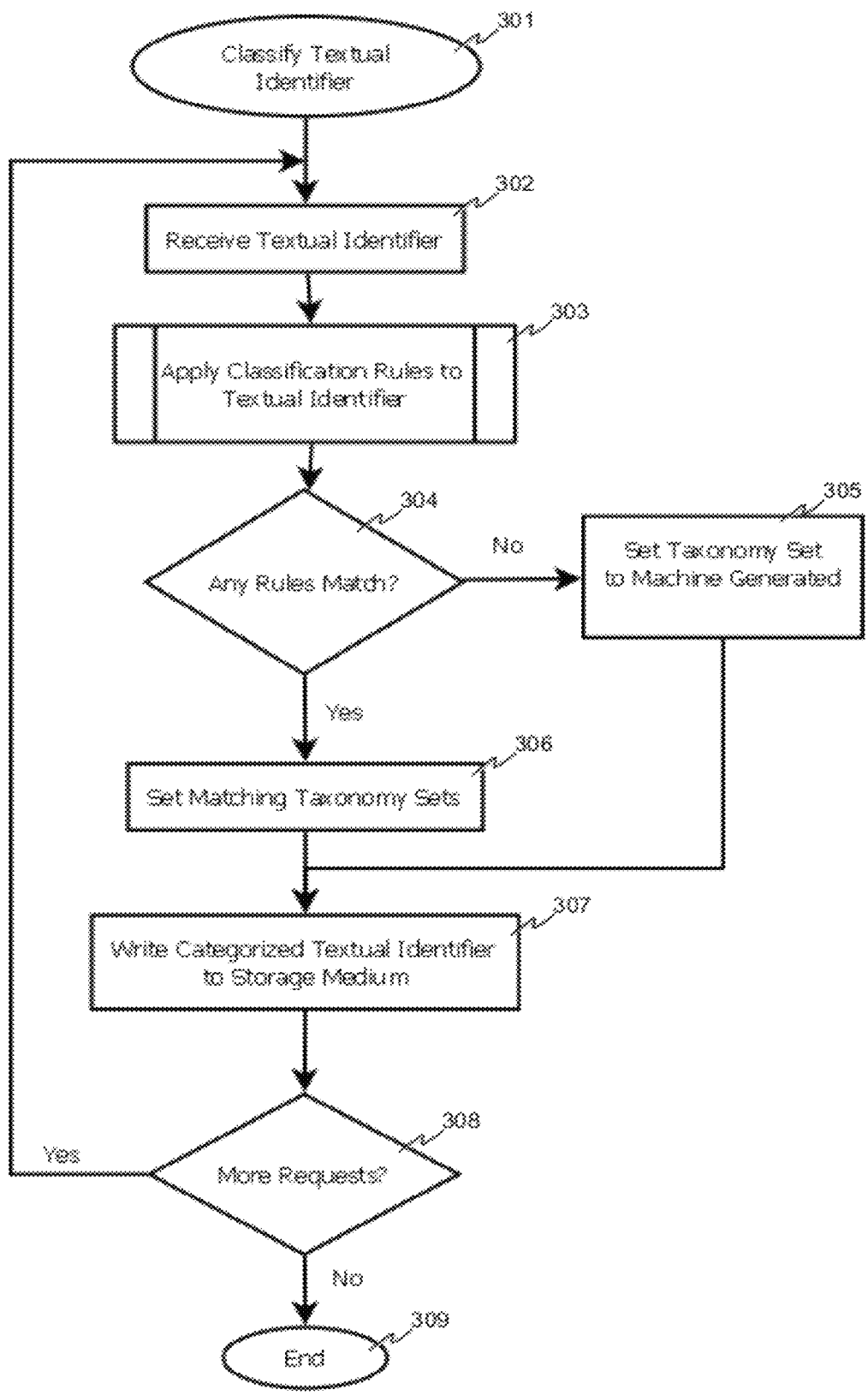
FIG. 3 is a diagram of an embodiment of the Classify Textual Identifier subroutine.

FIG. 3 illustrates further detail of a process of classifying a domain or other textual identifier as implemented at step 205 of FIG. 2. The process includes receiving an unclassified textual identifier at 302. The subroutine of applying all applicable classification rules is applied to the textual identifier at 303. Thereafter, an inspection of the results of the classification rules 304 is performed to determine if any of the classification rules match the textual identifier. If none of the classification rules match the textual identifier, the textual identifier's taxonomy set is set to "machine generated" at 305. Otherwise, the textual identifier is labeled according to all appropriate matching classification rules at 306. Thereafter, the process continues to write the classified textual identifier to a storage medium (such as 107 of FIG. 1) at 307. If additional textual identifiers are passed to the classify textual identifier subroutine, the process continues at 302 or ends at 309 if no other textual identifiers remain to be classified.

As a specific example, the taxonomy used to classify domain name resolution requests may include the categories of "machine generated," and "not machine generated." When a domain name resolution request is received at 302, various classification rules as described elsewhere herein may be applied to determine whether it is believed that the request was generated by a machine. If so, for example if a classification rule matches the request, the request is categorized as "machine generated." Otherwise, it is classified as "not machine generated." Alternatively, requests may be categorized as "machine generated" unless they match one or more classification rules. Other classifications and taxonomy structures may be used.

Figure 4:
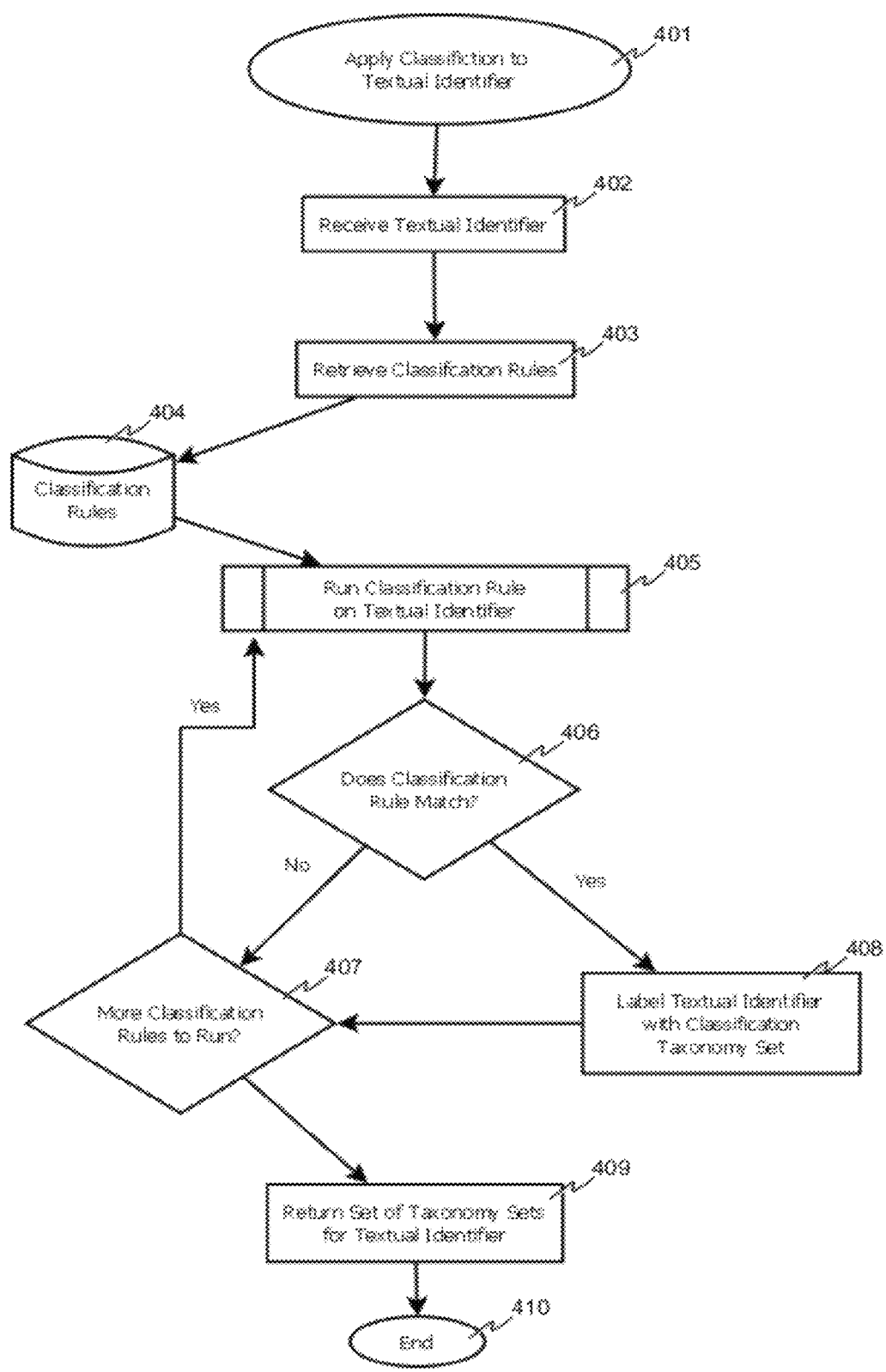
FIG. 4 is a diagram of an embodiment of the Apply Classification to Textual Identifier subroutine.

A process for applying classification rules to a textual identifier according to step 303 is illustrated in more detail starting at step 401 of FIG. 4. The process includes receiving an unclassified textual identifier at 402 and a set of all applicable classification rules are retrieved at 403 from the classification rule repository 404. Each classification rule is sequentially processed using the textual identifier as an input. After each classification rule has been applied to a textual identifier, an examination of the classification rule output is performed at 406. If and only if the classification rule matches the textual identifier, the textual identifier is labeled with the classification rule's corresponding taxonomical set at 408. After applying the label to the textual identifier at 408 or if the classification rule did not match the textual identifier 406, the process continues at 407 to determine if any additional classification rules remain to be processed against the textual identifier. If additional classification rules remain, the process resumes processing at 405 or continues to step 409 in which point the subroutine returns a set of taxonomy sets that match the textual identifier and thereafter ends at 410.

Figure 5:
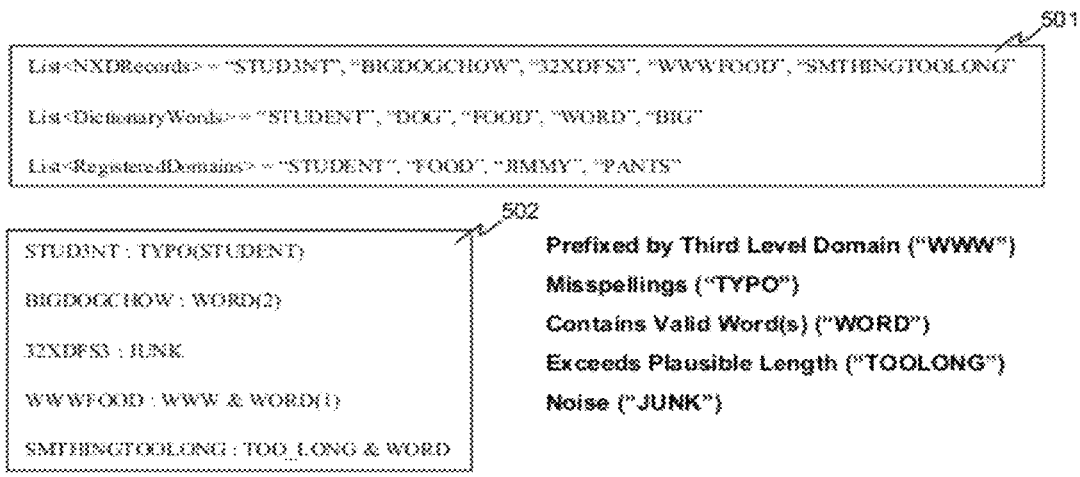
FIG. 5 illustrates an example of classified textual identifiers using a set of exemplary classification rules.

FIG. 5 is an example of applying a simple set of classification rules to a set of textual identifiers. Referring to FIG. 5, illustrated are three repositories 501 of information: a list of unclassified NXDomain records, a list of dictionary words, and a list of registered domains. For the purpose of simplifying the figure, the top-level domain portion of the domain has been omitted. The relationships shown in 502 illustrate examples of how the list of NXDomain records from 501 may be categorized into a taxonomy based on a set of simple classification rules. These classification rules, although not shown, may include rules such as the detection of typos of an NXDomain to a registered domain within a particular edit distance (e.g., a Levenshtein edit distance), the soundex equivalent or distance between a registered domain and an NXDomain, whether the NXDomain is a keyboard equivalent of a registered domain, if the NXDomain record contains a valid dictionary based word, if the domain is prefixed by a common term, or if the domain exceeds a character length limit. Those skilled in the art of classification and taxonomical categorization will appreciate this is a simple and only partial example of classification rules to be applied to a textual identifier.

Figures 6, 8:
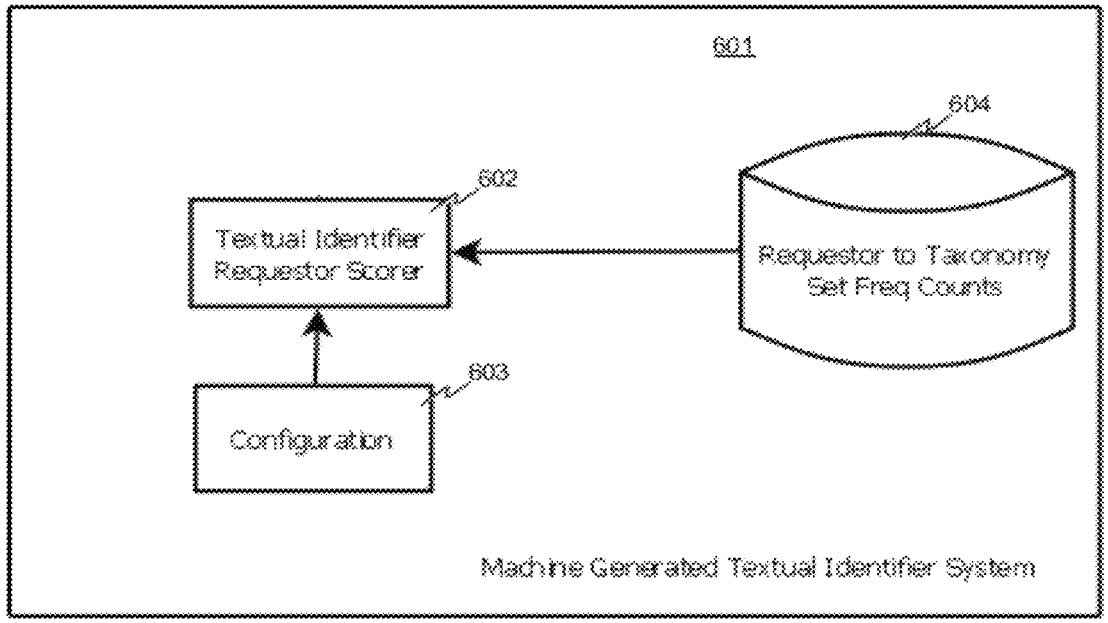
FIG. 6 is a high level component diagram of a Textual Identifier Requestor Scorer system used to identify requestors of textual identifiers as sources of machine or non-machine generated textual identifiers.
FIG. 8 is an example of raw NXDomain log data collected from authoritative root DNS servers.

A high level overview of the machine generated textual identifier requestor system 601 is illustrated in FIG. 6. The textual identifier requestor scorer 602 receives a configuration object 603. Configuration 603 may include of a set of heuristics to use when applying statistical measurements to the requestors of textual identifiers. For example, heuristics applied to requests for unresolvable domain names may include the percentage of total requests received at a particular server that are for NXDomains, the proportion of total NXDomain requests generated by a particular remote site, location, or server, the relative number of requests for resolvable versus unresolvable domains received from a particular requestor, and the like. An external repository storing requestors to taxonomy set frequency counts 604 is used to retrieve data for scoring and determination if a requestor exhibits a profile consistent with normal and acceptable system use or if the request is indicative of an automated process as might be implemented by an Internet bot, i.e. whether a non-machine or machine is generating textual identifiers.

Figure 7:
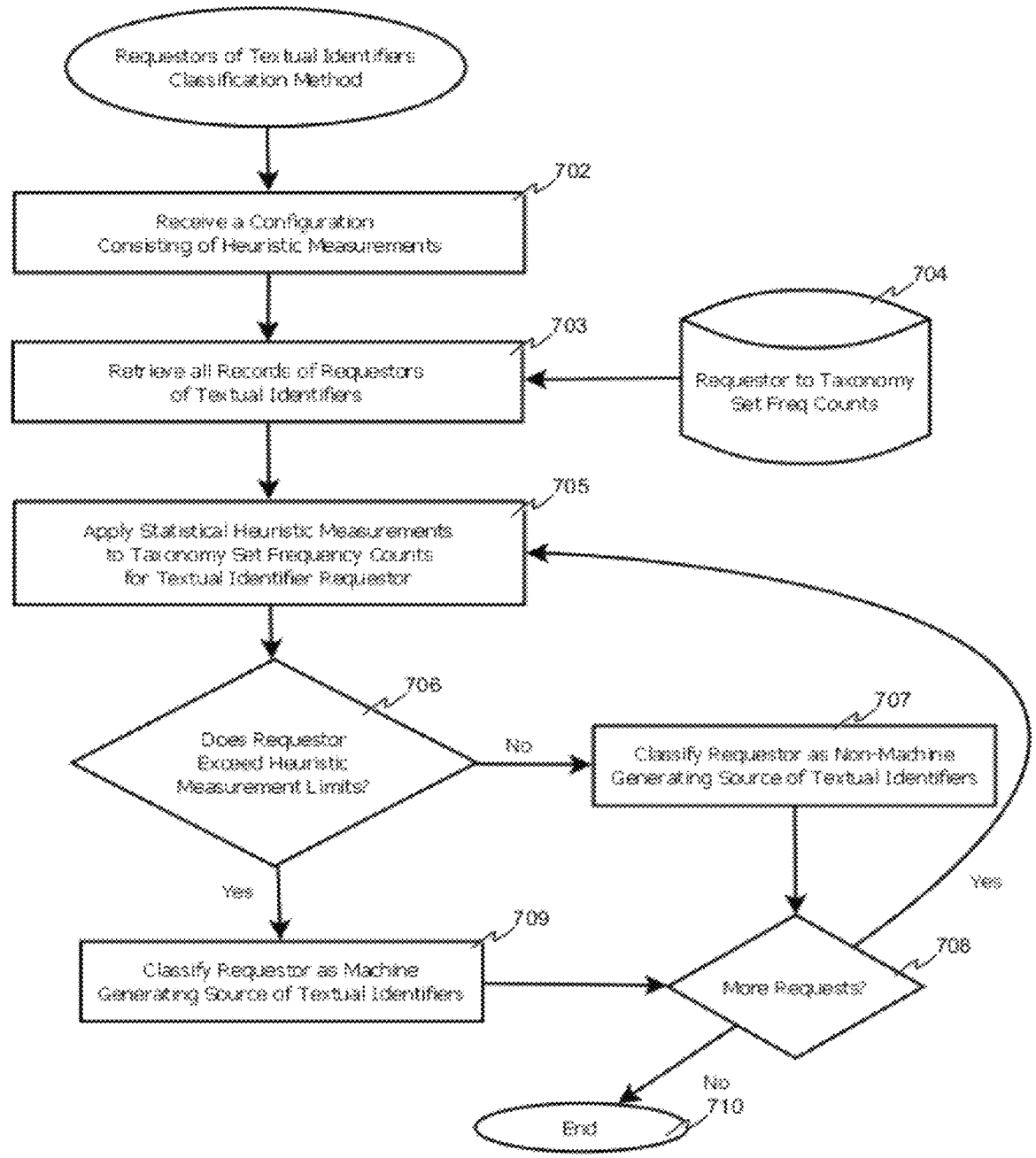
FIG. 7 is a process flow diagram of a Textual Identifier Requestor Scorer.
Figure 9:
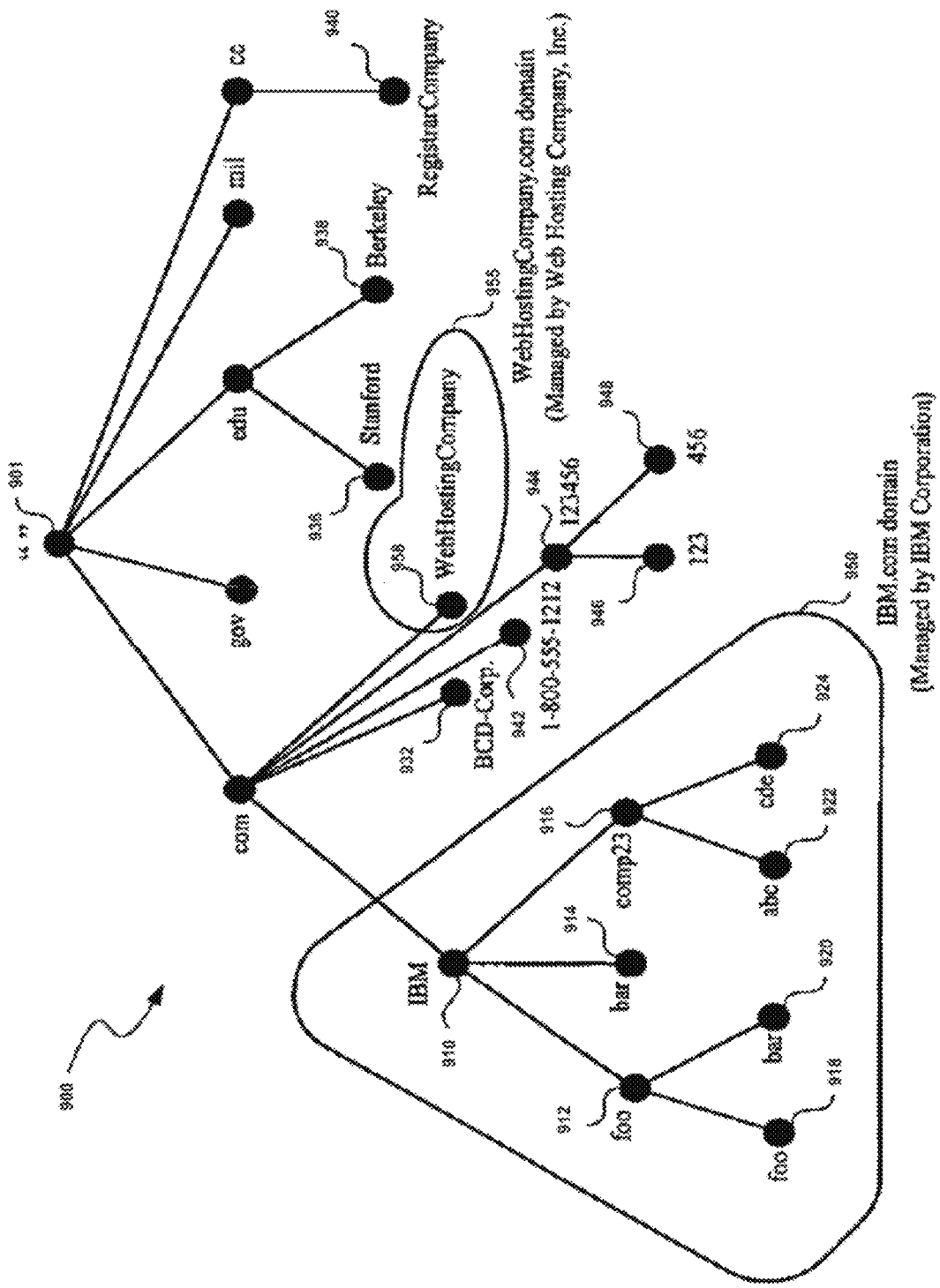
FIG. 9 is a network diagram illustrating interconnected network devices and Domain Name System (DNS) information.
Figure 10:
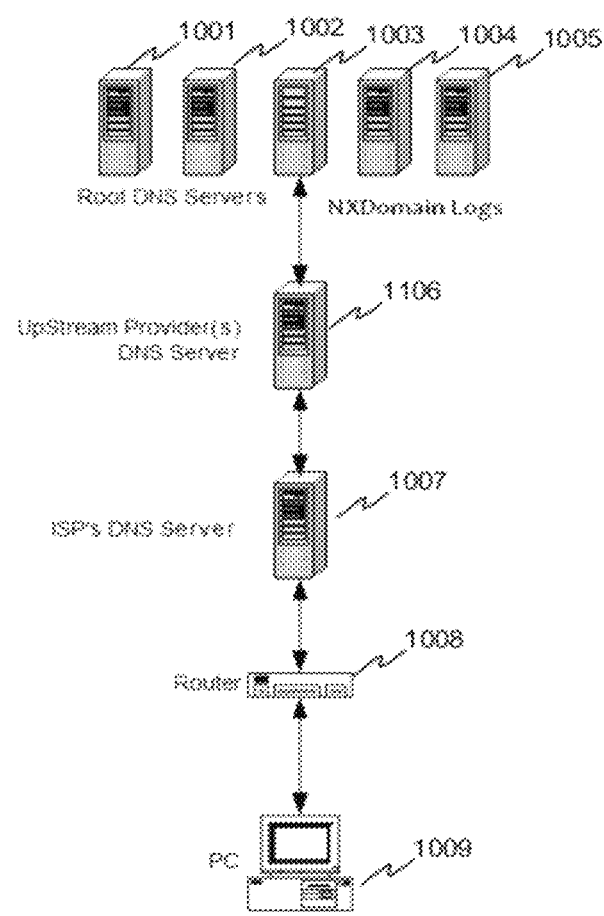
FIG. 10 is a network diagram illustrating interconnected network devices and Domain Name System information.

FIG. 7 is a more detailed process flow of textual identifier requestor scoring system 601 of FIG. 6. The process receives a configuration consisting of heuristic measurement properties at 702. The system then retrieves all records of requestors of textual identifiers at 703 from the external repository of requestor-to-taxonomy-set counts 704. Thereafter, each requestor from the returned list of 703 is processed sequentially and a statistical heuristic measurement is applied to the requestor's taxonomical set frequency counts at 705. The resulting measurement is then processed at 706 to determine if the value exceeds a predefined heuristics measurement limit or threshold at 706. If the textual identifier requestor's measurement does exceed the limit, the textual identifier is classified as a machine generating source of textual identifiers 709. Otherwise, at 707, the textual identifier requestor is classified as a non-machine generating source of textual identifiers. The process then continues at 708 to determine if more requestors from step 703 remain to be measured. If there are additional requestors to measure, program flow returns to and continues at 705 and processes the next textual identifier requestor. Otherwise, the process continues to 710 and ends. The use of heuristics as described herein may provide additional benefits. For example, it may be possible to identify mis-configured and/or mis-behaving locations more quickly than through conventional methods. As a specific example, if a limited number of requestors, sites, or locations were responsible for a relatively large number of requests for unresolvable domains, the resulting heuristic analysis may identify those requestors as mis-configured or as malicious actors.

FIG. 8 is an example of raw NXDomain log data collected from authoritative root DNS servers. Each line in the illustrated log represents an unresolved resolution request for an NXDomain including date and time of the request, the IP address of the requestor, i.e., the NXDomain and other data/information specified or permitted by the applicable standard.

NXDomain log data or similar logged data regarding requests for unresolvable textual identifiers may be used to identify a source of machine-generated requests, and/or classify various requestors as being sources of machine generated requests or not. For example, a unique (i.e., excluding duplicates) set of unresolvable domains requested within a given time period may be extracted from the log. Each domain within the set may be classified into predefined taxonomical sets, such as machine generated or not machine generated. A count of the number of requests received for each unresolvable domain within each set may be generated for each of a set of requestors. Finally, a threshold or other heuristic measurement may be applied to determine whether each requestor exhibits a certain level of machine generated traffic. In some cases, the "most requested" NXDomains may be identified. Other metrics in addition to "most requested" also may be used. More generally, various metrics may be used in the present invention to identify various interesting textual identifiers from among a set of candidate textual identifiers, such as those identified as candidates for suggesting to a user or other subset of non-existent, unregistered, or unresolvable identifiers.

Note that any or all of the devices of the described apparatus for identifying requestors of machine-generated (e.g., Internet bots) requests for resolve a textual identifier and associated hardware may be used in various embodiments of the present invention. However, it can be appreciated that other configurations of the system may include more or fewer devices than those discussed above. The system may alternately be used in any system which would usefully track usage updates, read frequency, etc.

Figure 11:
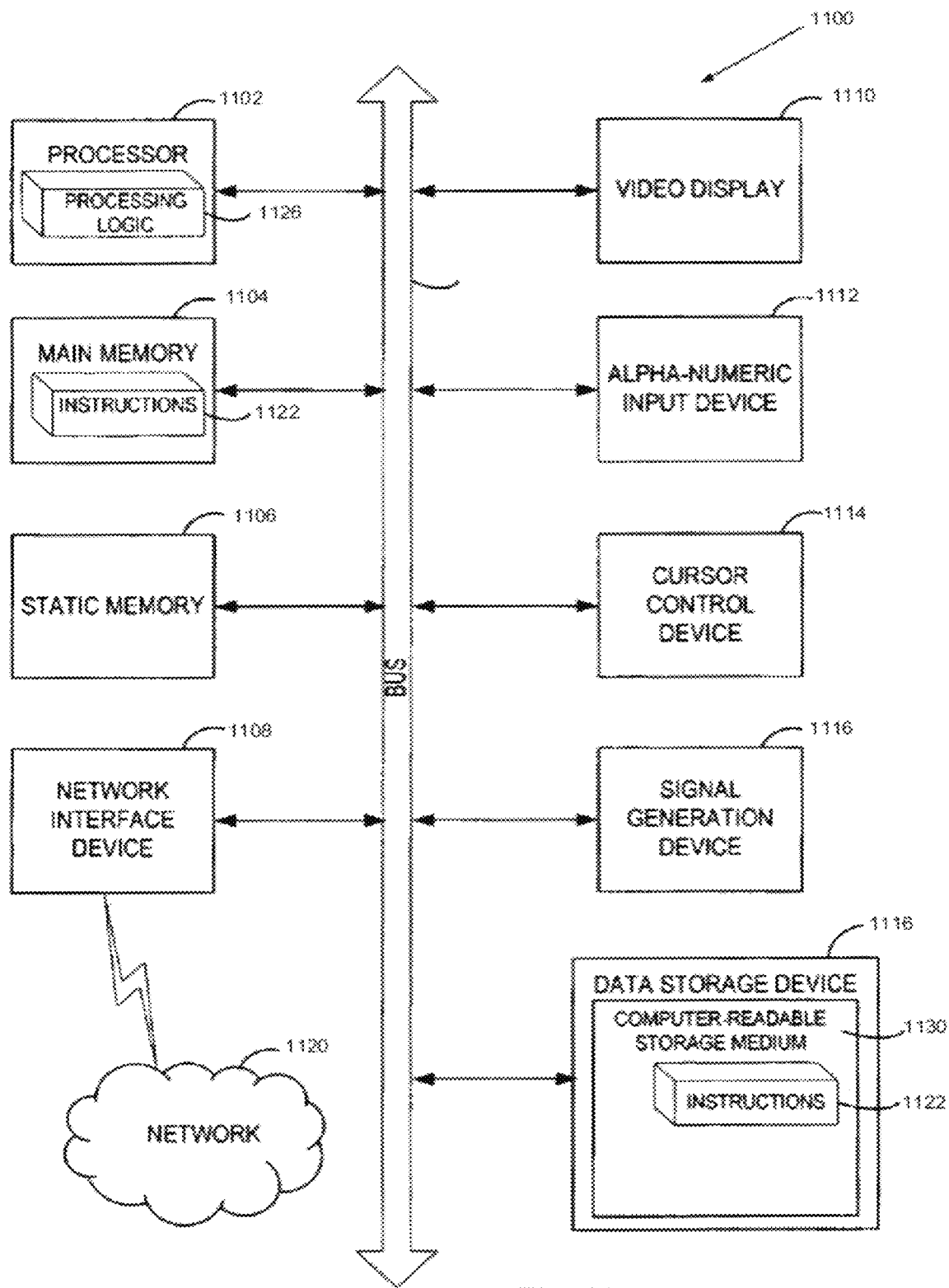
FIG. 11 is an exemplary block diagram of a computer supporting a Textual Identifier Classification System and a Textual Identifier Requestor Scorer system computer in accordance with methods and system consistent with the present invention.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1132.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 402 is configured to execute the processing logic 1126 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 414 (e.g., a mouse), and a signal generation device 1116 (e.g., a speaker).

The data storage device 1118 may include a machine-accessible storage medium 1130 (also known as a machine-readable storage medium) on which is stored one or more sets of instructions (e.g., software 1122) embodying any one or more of the methodologies or functions described herein. The software 1122 may also reside, completely or at least partially, within the main memory 1104 and/or within the processing device 1102 during execution thereof by the computer system 1100, the main memory 1104 and the processing device 1102 also constituting machine-accessible storage media. The software 1122 may further be transmitted or received over a network 1120 via the network interface device 1108.

While the computer-readable storage medium 1130 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Some embodiments of methods, apparatus and software for identifying requestors that are the source of machine-generated requests to resolve a textual identifier have been herein described and disclosed. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled. It should further be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

What is claimed is:

1. A method of identifying one or more sources of machine-generated domain resolution requests, the method comprising:
   defining a plurality of taxonomical sets to contain character strings having particular syntax characteristics, wherein each of the plurality of taxonomical sets is either for character strings of domains having machine generated syntax characteristics, or for character strings of domains having non-machine generated syntax characteristics, wherein the plurality of taxonomical sets include a set of unresolvable domains exhibiting a syntax characteristic of existing registered domains, wherein the syntax characteristic of existing registered domains is selected from the set of syntax characteristics consisting of:
   (i) a character string length less than a threshold number of characters;
   (ii) a soundex equivalent of a registered textual identifier;
   (iii) a keyboard-equivalent entry of a registered textual identifier;
   (iv) an edit distance from a registered textual identifier that is less than a threshold value; and
   (v) an n-gram analysis of character frequency distributions observed within the domain name;
   maintaining a log of requests to one or more DNS servers to resolve unresolvable domains, each request made by a requestor;
   identifying, after the defining, from among the requests a set of unresolvable domains requested within a given time period;
   classifying, after the defining, the domains within the set of unresolvable domains into the plurality of taxonomical sets;
   maintaining a count of a number of requests for each unresolvable domain made by each requestor within each of the taxonomical sets; and
   identifying requestors exhibiting a threshold level of machine generated traffic directed to at least one unresolvable domain based at least in part on at least one count of the number of requests for each unresolvable domain made by each requestor within each of the taxonomical sets.

2. The method of claim 1 wherein said requestors are name servers.

3. The method of claim 1 wherein said machine generated requests are generated by an Internet bot.

4. The method of claim 3 wherein said Internet bot is selected from the group consisting of an internet agent, a search engine spider, a spider-bot, a robot, virus malware, a crawler, an ant and an automatic indexer.

5. The method of claim 1 wherein said unresolvable domains are non-existent domains.

6. The method of claim 1 wherein said log of requests comprises non-existent domain data store.

7. The method of claim 1 wherein said step of identifying from among the requests a set of unresolvable domain names within a given time period comprises:
   storing a list of domains with corresponding request pattern statistics over said time period.

8. The method of claim 1 wherein said taxonomical sets include a set of unresolvable domains exhibiting a syntax characteristic of non-existent domains.

9. The method of claim 1 wherein the step of applying heuristics comprises:
   identifying a threshold number of machine-generated domains relative to non-machine-generated domains.

10. The method according to claim 1, further comprising:
    identifying log records of requests made by the sources of machine generated requests as suspicious requests; and
    creating a set of candidate domains by ignoring the suspicious requests.

11. The method according to claim 10 wherein said domains are non-existent domains.

12. The method according claim 11 further comprising:
    identifying a set of unresolvable domains from said set of candidate domains that meet a predefined metric; and
    suggesting for registration one or more of the identified domains.

13. The method according claim 11 further comprising:
    identifying a set of unresolvable domains having the highest number of requests from said set of candidate domains; and
    suggesting for registration said most requested domains.

14. The method according to claim 11 further comprising weighting the unresolvable domains within said set of candidate domains based on numbers of requests and assigning corresponding registration fees.

15. The method according to claim 1 further comprising:
    configuring network resources to mitigate disruptive effects caused by the identified sources.

16. The method according to claim 15 wherein said step of configuring includes throttling message traffic from the identified sources.

17. An apparatus for identifying one or more sources of machine-generated domain resolution requests, the apparatus comprising:
    a memory storing a log of requests to one or more DNS server to resolve unresolvable domains, each request made by a requestor, the memory further storing definitions of a plurality of taxonomical sets defined to contain character strings having particular syntax characteristics, wherein each of the plurality of taxonomical sets are either for character strings of domains having machine generated syntax characteristics, or for character strings of domains having non-machine generated syntax characteristics, wherein the plurality of taxonomical sets include a set of unresolvable domains exhibiting a syntax characteristic of existing registered domains, wherein the syntax characteristic of existing registered domains is selected from the set of syntax characteristics consisting of:
    (i) a character string length less than a threshold number of characters;
    (ii) a soundex equivalent of a registered textual identifier;
    (iii) a keyboard-equivalent entry of a registered textual identifier;
    (iv) an edit distance from a registered textual identifier that is less than a threshold value; and
    (v) an n-gram analysis of character frequency distributions observed within the domain name; and
    a processor configured to:
    identify from among the requests a set of unresolvable domains requested within a given time period;
    classify the domains within the set of unresolvable domains into the plurality of taxonomical sets;

maintain a count of a number of requests for each unresolvable domain made by each requestor within each of the taxonomical sets; and identify requestors exhibiting a threshold level of machine generated traffic directed to at least one unresolvable domain based at least in part on at least one count of the number of requests for each unresolvable domain made by each requestor within each of the taxonomical sets.

18. The apparatus of claim 17 wherein said unresolvable domains are non-existent domains.

19. The apparatus of claim 17 wherein said taxonomical sets include a set of unresolvable domains exhibiting a syntax characteristic of non-existent domains.

20. A non-transitory computer-readable storage medium that provides instructions that cause a processor to perform operations comprising:

defining a plurality of taxonomical sets to contain character strings having particular syntax characteristics, wherein each of the plurality of taxonomical sets is either for character strings of domains having machine generated syntax characteristics, or for character strings of domains having non-machine generated syntax characteristics, wherein the plurality of taxonomical sets include a set of unresolvable domains exhibiting a syntax characteristic of existing registered domains, wherein the syntax characteristic of existing registered domains is selected from the set of syntax characteristics consisting of:
(i) a character string length less than a threshold number of characters;
(ii) a soundex equivalent of a registered textual identifier;
(iii) a keyboard-equivalent entry of a registered textual identifier;
(iv) an edit distance from a registered textual identifier that is less than a threshold value; and
(v) an n-gram analysis of character frequency distributions observed within the domain name;

maintaining a log of requests to DNS servers to resolve unresolvable domains, each request made by a requestor;

identifying from among the requests a set of unresolvable domains requested within a given time period;

classifying the domains within the set of unresolvable domains into the plurality of taxonomical sets;

maintaining a count of a number of requests for each unresolvable domain made by each requestor within each of the taxonomical sets; and identifying requestors exhibiting a threshold level of machine generated traffic directed to at least one unresolvable domain based at least in part on at least one count of the number of requests for each unresolvable domain made by each requestor within each of the taxonomical sets.

21. The non-transitory computer-readable storage medium of claim 20 wherein said unresolvable domains are non-existent domains.

22. The non-transitory computer-readable storage medium of claim 20 wherein said taxonomical sets include a set of unresolvable domains exhibiting a syntax characteristic of non-existent domains.

23. A method comprising:

defining a plurality of taxonomical sets to contain character strings having particular syntax characteristics, wherein each of the plurality of taxonomical sets is either for character strings having machine generated syntax characteristics or for character strings of domains having non-machine generated syntax characteristics;

maintaining a log of requests to DNS servers to resolve unresolvable textual identifiers, each request made by a requestor;

identifying from among the requests a set of unresolvable textual identifiers requested within a given time period;

classifying the unresolvable textual identifiers within the set of unresolvable textual identifiers into the plurality of taxonomical sets, wherein the plurality of taxonomical sets comprise at least one set of non-machine-generated domains based on a syntax characteristic selected from the group of:
(i) a character string length less than a threshold number of characters;
(ii) a soundex equivalent of a registered textual identifier;
(iii) OD a keyboard-equivalent entry of a registered textual identifier; and
(iv) an edit distance from a registered textual identifier that is less than a threshold value; and
(v) an n-gram analysis of character frequency distributions observed within the domain name;

maintaining a count of a number of requests for each unresolvable textual identifier made by each requestor within each of the taxonomical sets;

identifying requestors exhibiting a threshold level of machine generated traffic directed to at least one unresolvable textual identifier based on statistical counts of the taxonomical sets; and based at least in part on at least one taxonomical set that each textual identifier was classified into, determining if the requestor was an Internet bot.

* * * * *